United States Patent [19]
Nitschke et al.

[11] Patent Number: 5,375,056
[45] Date of Patent: Dec. 20, 1994

[54] ARRANGEMENT FOR MONITORING A TRANSDUCER FOR DETECTING AN OPERATING VARIABLE IN A MOTOR VEHICLE

[75] Inventors: Werner Nitschke, Ditzingen; Thomas Frey, Hassmersheim; Reinhard Pfeufer, Möglingen; Thomas Zeller, Ditzingen, all of Germany

[73] Assignee: Robert Bosch GmbH, Stuttgart, Germany

[21] Appl. No.: 869,664

[22] Filed: Apr. 16, 1992

[30] Foreign Application Priority Data

Apr. 18, 1991 [DE] Germany .................. 4112665

[51] Int. Cl.⁵ ............................................ G06F 11/30
[52] U.S. Cl. ................... 364/424.03; 364/551.01; 73/117.3
[58] Field of Search ........... 364/424.03, 551, 431.01, 364/507; 73/117.3; 371/29

[56] References Cited

U.S. PATENT DOCUMENTS

| | | | |
|---|---|---|---|
| 4,398,258 | 8/1983 | Naitoh et al. | 364/551 |
| 4,444,048 | 4/1984 | Nitschke et al. | 364/551 |
| 4,521,885 | 6/1985 | Melocik et al. | 371/29 |
| 4,623,974 | 11/1986 | Denz et al. | 364/551 |
| 5,107,427 | 4/1992 | Peter et al. | 364/424.03 |

*Primary Examiner*—Kevin J. Teska
*Assistant Examiner*—Tan Q. Nguyen

[57] ABSTRACT

An arrangement for detecting a changing variable in a motor vehicle includes at least one transducer having terminals with at least one terminal being connected to a pole of a supply voltage. In addition, an actuable switch element is provided which interrupts at least one connecting line connected to a terminal. The potential of this terminal is detected relative to a reference potential when the switch element is open and a fault state of the transducer is assumed when there is an impermissible fluctuation of the potential value during at least two detecting operations.

12 Claims, 3 Drawing Sheets

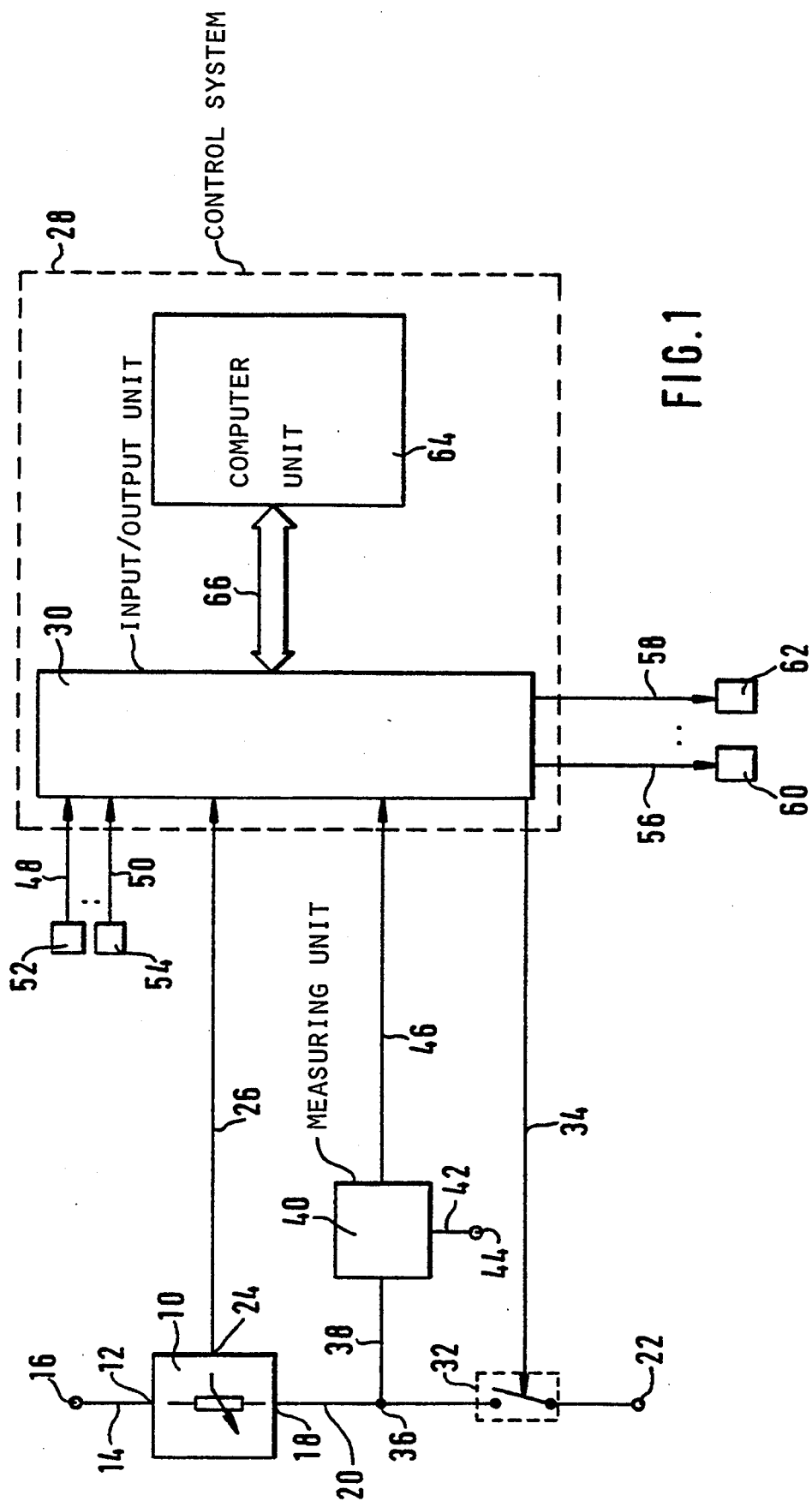

ARRANGEMENT FOR MONITORING A TRANSDUCER FOR DETECTING AN OPERATING VARIABLE IN A MOTOR VEHICLE

FIELD OF THE INVENTION

The invention relates to an arrangement for detecting a changing variable in a motor vehicle. The arrangement includes at least one transducer which has at least one terminal connected to a pole of a supply voltage. At least one terminal connection can be opened via an actuable switch element.

BACKGROUND OF THE INVENTION

An arrangement of the kind described above is disclosed in U.S. Pat. No. 5,107,427. Here, a detecting arrangement for a changing variable in a motor vehicle is disclosed having at least one transducer. The transducer has at least one terminal connected to a pole of the supply voltage and a signal line terminal. For monitoring purposes, an actuable switch element is connected to at least one supply voltage terminal. The switch element opens the terminal connection for short intervals in pregiven test cycles. A signal processor causes this interruption to take place and detects the potential of all transducer terminals and derives fault states in the area of the transducer from a comparison of these potential values with each other when the terminal connection is opened and closed. The known arrangement is applied primarily to position transducers in the area of a motor vehicle especially for potentiometer arrangements for detecting the position of an operator-controlled element or a power-determining element. With these measures, fault states are detected which can be attributed to short circuits, interruptions and/or shunts in the area of the detecting arrangement or transducer and their line connections. However, in known procedures, the measurement or detection of several potentials for monitoring an individual transducer is necessary. This requires a corresponding complexity as to terminals of the signal processor as well as measurement lines or measuring devices.

SUMMARY OF THE INVENTION

In view of the above, it is an object of the invention to provide an arrangement for detecting a changing variable in motor vehicles in such a manner that the complexity with respect to the monitoring thereof is reduced.

According to a feature of the invention, the potential of a terminal of a detecting arrangement or of a transducer is detected in the open state with respect to a reference potential and for an impermissible deviation of the potential values, and especially for impermissible fluctuations for at least two detecting procedures, a fault state of the transducer or the detecting arrangement is recognized.

The procedure provided by the invention reduces the complexity for monitoring a detecting device for a changing variable in a motor vehicle.

Special advantages result in combination with a position transducer for a movable element in the area of the motor vehicle.

The procedure of the invention ensures the detection of shunt resistances, short circuits and/or interruptions in the region of the transducer or the detecting device. For potentiometer arrangements, this detection is independent of the position of the wiper as well as of the track resistance of the particular potentiometer.

BRIEF DESCRIPTION OF THE DRAWINGS

The invention will now be described with reference to the drawings wherein:

FIG. 1 is an overview block diagram of the arrangement according to the invention which includes a detecting device for a changing variable and a control system for a motor vehicle;

DESCRIPTION OF THE PREFERRED EMBODIMENTS OF THE INVENTION

Figure 2A:
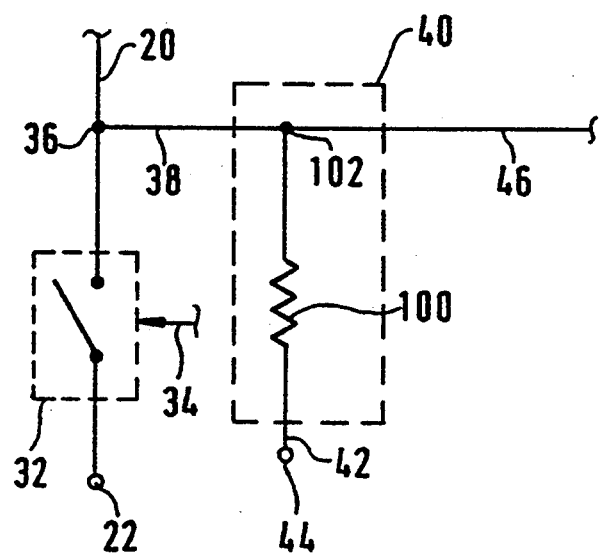
FIGS. 2a and 2b are schematics of respective embodiments of the measuring unit of the detecting arrangement of the invention; and, FIG. 3 is an exemplary flowchart which describes the evaluation in a computer unit of tile detected data for the purpose of recognizing faults.

In FIG. 1, reference numeral 10 identifies a detecting device or transducer for a changing variable in a motor vehicle. This transducer 10 has at least three terminals. Terminal 12 is connected via a connecting line 14 to a pole 16 of the supply voltage, for example, the positive pole. Another terminal 18 is connected via a connecting line 20 to the other pole 22 of the supply voltage, for example, a negative pole. The signal line 26 is connected to the third terminal 24 of the transducer and connects the transducer 10 to the control system 28 where the transducer 10 is connected to an input/output unit 30. The signal line 26 transmits the value of the changing variable detected by the transducer 10.

An electrically actuable switch element 32 is included in the connecting line 20 between terminal 18 and supply voltage pole 22. The switch element 32 can, for example, be a switchable transistor. The actuable switch element 32 is connected via a signal line 34 to the input/output unit 30 of the control system 28. The control system 28 actuates the switch element 32 via the input/output unit 30. In addition, a connecting node 36 is provided on connecting line 20 between terminal 18 and switch element 32 and a connecting line 38 interconnects the measuring unit 40 and connecting node 36. The measuring unit 40 includes voltage supply terminals (not shown) which are present in several embodiments. Measuring unit 40 also includes a terminal connection 42 which is connected to a reference potential terminal 44. In an advantageous embodiment, this reference potential is identical to a potential of the supply voltage pole. A signal line 46 connects the measuring unit 40 to the input/output unit 30 of the control system 28.

Additional variables of the engine and/or of the motor vehicle are supplied from measuring devices 52 to 54 to the input/output unit 30 of the control system 28 via input lines 48 to 50, respectively. Output lines 56 to 58 connect the input/output unit 30 with devices 60 to 62, respectively, which perform control functions carried out by the control system 28. In addition to the input/output unit 30, the control system 28 includes at least one computer unit 64 provided with memory elements. The computer unit 64 is connected to the input/output unit 30 via a line or bus system 66.

Many examples of control systems for motor vehicles are known so that the control system 28 can be any one of the following: an ABS/ASR-system, an electronic transmission control system, etcetera. The operating variables of the engine and/or of the motor vehicle supplied via input lines 48 to 50 as well as the devices 60 to 62 driven via the output lines 56 to 58, respectively, originate from the particular function of the control system 28 in a manner known per se. One engine control system is supplied, for example, with operating variables such as engine speed, engine temperature, battery voltage, road speed, the position of the operator-controlled element actuated by the driver, the position of the throttle flap or the position of the injection pump, etcetera; whereas, any one or more of the following can be driven via lines 56 to 58: actuators for adjusting the engine power via a throttle flap or injection pump, actuators for driving fuel injection valves and/or actuators for adjusting the ignition time point. The devices 60 to 62 also include display devices. The computer unit 64 is configured in such a manner that the particular desired function is carried out.

The monitoring measures described below for the transducer 10 are described in the context of a position transducer for the position of a movable element in the motor vehicle. The position transducer is configured as a potentiometer arrangement.

The procedure provided by the invention is, however, applicable to all those transducers which are dependent upon a supply voltage and have at least one signal output and for which the problems described below occur.

In addition to short circuits or interruptions, so-called shunts or leakage resistances can lead to defective measuring results in the transducer arrangement shown in FIG. 1. These shunts can occur especially between the signal line 26 carrying the measurement signal and the poles 16 and/or 22 of the supply voltage.

In potentiometers, shunts occur because of leakage resistance between the wiper and the poles of the supply voltage. These shunts occur, for example, because of contamination of the potentiometer track or result from deterioration associated with use. Leakage resistances of this kind in potentiometers form resistances in parallel to the particular component resistance of the potentiometer track. In this way, the divider ratio of the potentiometer and therefore the measurement value tapped via the signal line 26 is falsified. For this reason, the control system 28 is supplied with an incorrect measurement value so that the control system 28 cannot satisfactorily carry out the intended control functions which considers the measurement value.

The operation of the transducer 10 is monitored in that the switch element 32 is driven for a short time (in the ten-millisecond range) via the connecting line 34 from the control system 28 in pregiven test cycles which take place during the operating cycle of the motor vehicle. In this way, the switch element 32 interrupts the connecting line. Then, the potential of the terminal 18 of the transducer 10 is measured directly or indirectly with respect to the reference potential 44 by the measuring unit 40 via the input line 46 from the control system 28. If the above-mentioned shunt resistances are present, then the potential of the terminal 18 changes in accordance with the wiper position when the connection is interrupted. Fault states in the area of the transducer 10 and especially shunts can be detected from a comparison of the potential values of the terminal 18, which are detected in the sequential detecting cycles, and the reference potential of point 44. These fault states are detected when the detected potential value or the terminal 18 deviates impermissibly from a pregiven value or when at least two potential values detected in sequential detecting cycles deviate impermissibly from each other. The last case is then present when the measured value differs from the previously measured value or the previously measured values by a pregiven amount once or several times. In an advantageous embodiment, the reference potential of the point 44 is the negative pole of the supply voltage, for example, the ground terminal of the transducer 10.

Figure 2B:
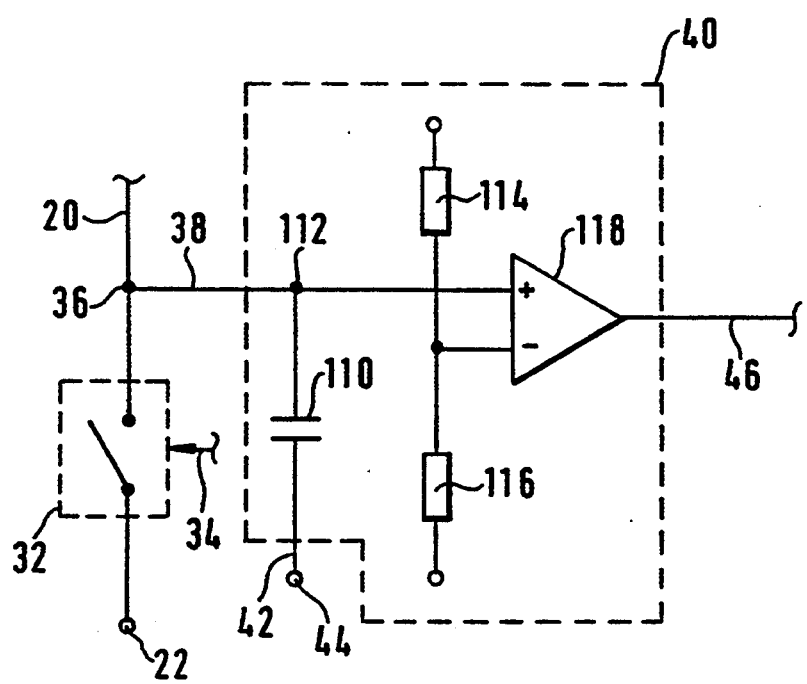

FIGS. 2a and 2b show two embodiments of the measuring unit 40. Here, the reference numerals used are the same as used with respect to the elements known from FIG. 1 and their operation is not discussed in greater detail below.

In FIG. 2a, the measuring unit 40 comprises a measuring resistor 100 which is connected between the connecting line 46 extending from a connecting node 102 and the reference point 44. If the reference voltage at point 44 is the negative pole of the supply voltage, then this arrangement corresponds to a direct measurement of the potential of the terminal 18 of the transducer 10. The voltage value across the resistor 100 is transmitted to the control system 28 via the signal line 46.

FIG. 2b shows an indirect measurement of the potential of the terminal 18 by means of the charging time of a capacitor 110. In this embodiment, the measuring unit 40 includes the capacitor 110 which is connected between a connecting node 112 on the line 38 and the reference potential terminal 34. The measuring unit 40 also includes a threshold value switch defined by a voltage divider (114, 116) and an operational amplifier 118. The output signal of the threshold value switch is supplied via the output line 46 to the control system 28. The measuring operation takes place in that a counter in the computer unit 64 begins to operate when the connecting line is interrupted by actuating the switch element 32. The counter is then stopped when the capacitor voltage exceeds the value adjusted by means of the voltage divider (114, 116). The counter reading is then a measure for the charging time of the capacitor. This charging time is a measure for the potential of the terminal 18 in the same manner as the previously-mentioned voltage across the resistor 100 and is therefore a measure for shunts in the area of the transducer 10 which may possibly be present. The charging time of the capacitor 110 changes because of shunt resistances which lie in parallel to the potentiometer track resistor. This change of the charging time in various detecting cycles is evaluated in the computer unit 64 as mentioned above.

Figure 3:
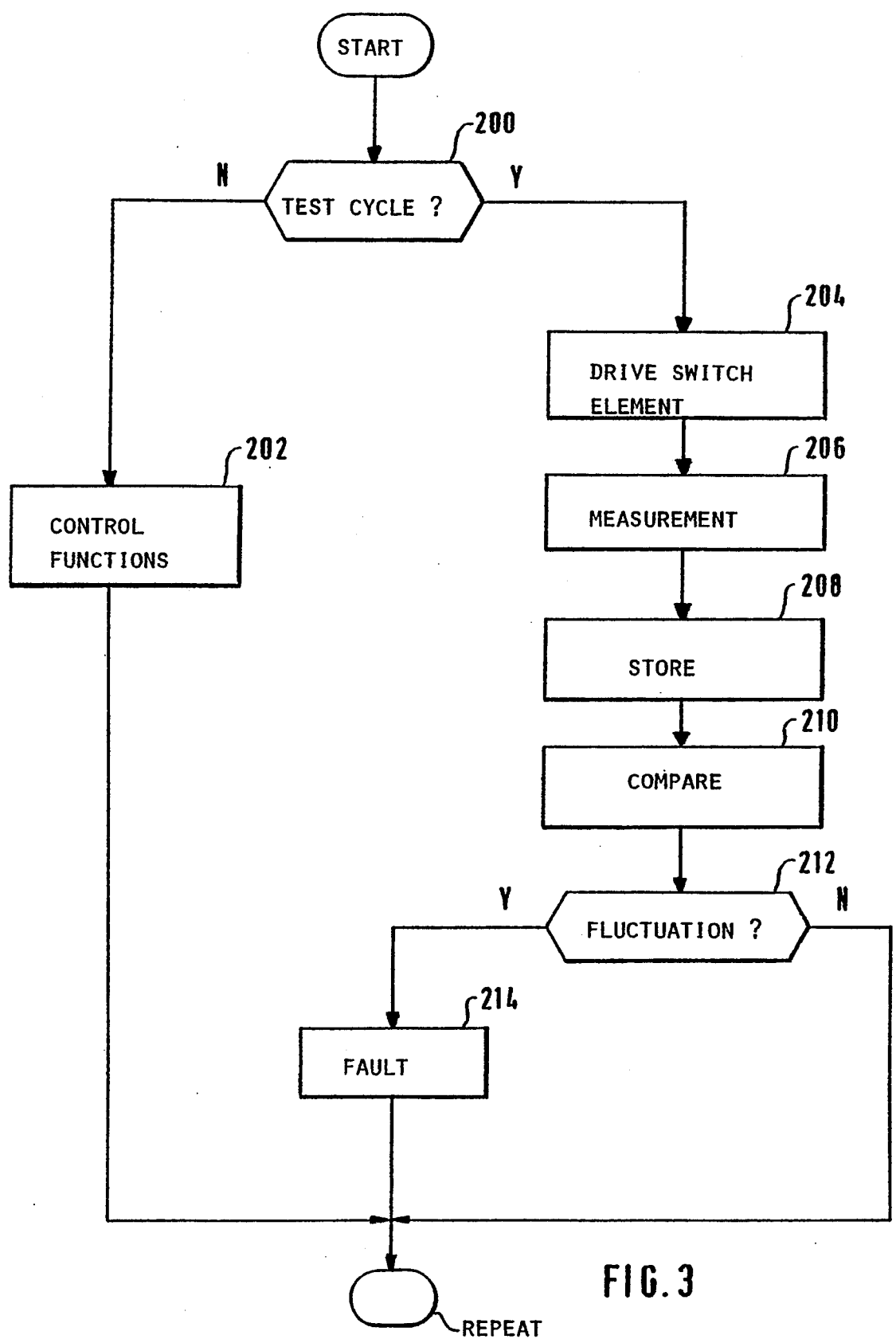

One embodiment for one such evaluation is described with reference to the flowchart of FIG. 3. The program starts with the start of the operating cycle of the motor vehicle. After program start, an inquiry is made in a first inquiry step 200 as to whether tile test cycle which runs cyclically should be initiated. If this is not the case, then, according to step 202, the control function is started and the program part shown in FIG. 3 is repeated at a given time. If a test cycle is initiated according to step 200, then, in step 204, the switch element 32 is actuated by an appropriate drive, the connecting line is interrupted and in the subsequent step 206, the voltage measurement (or the time measurement in the case of the embodiment of FIG. 2b) is initiated. The results detected are then stored according to step 208 and the test cycle is concluded by closing the switch element 32. In the evaluation step 210, the stored measured value is then compared to the previous value or values and, in inquiry step 212, a check is made as to whether the value detected in the present program run deviates by a pregiven amount from the previous value or values. This shows an impermissible fluctuation of the measured value so that, after step 214, it can be assumed that a fault is present in the area of the transducer 10. The measures which can be undertaken when a fault is recognized include, for example, the initiation of an emergency operation and/or of a fault display. If no fluctuation is determined according to step 212, then the program part is repeated at a pregiven time.

In an advantageous embodiment of the invention, the provision can be made that a certain number of impermissible fluctuations must be detected before a fault can be detected according to step 214.

The test cycle described above can take place during the operating cycle of the motor vehicle at pregiven time points independently of the particular operating condition. Furthermore, the described arrangement is only exemplary. The actuable switch element 32 can also be connected into the connecting line 14 to the positive pole of the supply voltage. Then the reference voltage can assume values deviating from ground potential and, in one embodiment, a discharge time of a capacitor can be evaluated in lieu of the charging time.

In lieu of the measuring units described with respect to FIGS. 2a and 2b, other methods known per se can be utilized for measuring potential.

It is understood that the foregoing description is that of the preferred embodiments of the invention and that various changes and modifications may be made thereto without departing from the spirit and scope of the invention as defined in the appended claims.

What is claimed is:

1. An arrangement for monitoring a transducer for detecting an operating variable in a motor vehicle having a motor, the arrangement comprising:

voltage supply means having first and second poles;

a transducer for producing a measurement signal indicative of said operating variable;

said transducer having a plurality of terminals and a plurality of connecting lines connected to said terminals, respectively;

a first one of said connecting lines being connected to said first pole;

a second one of said connecting lines being provided to transmit said measurement signal;

a control system connected to said second connecting line for receiving said measurement signal;

actuable switch means for interrupting one of said connecting lines on which a connecting line voltage is present which undergoes a change in response to a fault condition of said transducer or of said connecting lines;

said control system having an output for emitting a switching signal to said switch means to actuate said switch means;

reference voltage supply means for supplying a reference voltage;

a measuring unit having a first input for receiving said reference voltage;

said measuring unit having a second input for receiving said connecting line voltage from said one connecting line of said transducer when said switch means is actuated for measuring said connecting line voltage against said reference voltage and for emitting an output signal to said control unit indicative of said change;

said control unit including means for detecting a value of said output signal each time said one connecting line is interrupted and for storing the values detected; and, said control unit further including means for comparing one of the stored values to at least an other one of the stored values which was previously stored for determining a departure of said one stored value from said at least other one of said stored values and for detecting a fault condition of said transducer or said connecting line when said departure is greater than a pregiven amount.

2. The arrangement of claim 1, wherein the motor vehicle has an element which changes position during operation of the motor vehicle; and, said operating variable is indicative of the position of the movable element detected by said transducer.

3. The arrangement of claim 1, wherein a third one of said connecting lines is connected to ground and said switch means is connected into said third connecting line.

4. The arrangement of claim 3, said measuring unit comprising a measuring element connected between said third connecting line and said reference voltage.

5. The arrangement of claim 4, said measuring element being a resistor and said connecting line voltage being detected by the voltage dropping across said resistor.

6. The arrangement of claim 4, said measuring element being a capacitor and said connecting line voltage being detected over the charging time of said capacitor.

7. The arrangement of claim 4, said reference voltage being the voltage of said second pole of said voltage supply.

8. The arrangement of claim 1, said control system being adapted to run through pregiven test cycles during an operating cycle of the motor vehicle; and, said control system being connected to said actuable switch means for actuating the same during each of said pregiven test cycles.

9. The arrangement of claim 1, wherein said transducer includes a potentiometer arrangement for detecting the position of an operator-controlled element of the motor.

10. The arrangement of claim 1, wherein said motor is an internal combustion engine and said transducer includes a potentiometer arrangement for detecting the position of a power-determining element of said engine.

11. The arrangement of claim 1, said transducer being a potentiometer transducer and said comparing means functioning to detect said fault condition when said departure is greater than said pregiven amount for at least two comparisons of the stored values of said output signal to respective other ones of the stored values which were previously stored.

12. The arrangement of claim 1, wherein said transducer is a potentiometer transducer.

* * * * *

UNITED STATES PATENT AND TRADEMARK OFFICE
CERTIFICATE OF CORRECTION

PATENT NO. : 5,375,056
DATED : December 20, 1994
INVENTOR(S) : Werner Nitschke, Thomas Frey, Reinhard Pfeufer and Thomas Zeller It is certified that error appears in the above-indentified patent and that said Letters Patent is hereby corrected as shown below:

In column 2, line 15: delete "tile" and substitute -- the -- therefor.

In column 3, line 67: delete "or" and substitute -- of -- therefor.

In column 4, line 55: delete "tile" and substitute -- the -- therefor.

Signed and Sealed this

Twenty-eight Day of March, 1995

Attest:

BRUCE LEHMAN

*Attesting Officer*     *Commissioner of Patents and Trademarks*